US010755564B2

(12) United States Patent
Zheng et al.

(10) Patent No.: US 10,755,564 B2
(45) Date of Patent: Aug. 25, 2020

(54) SYSTEM TO OPTIMIZE SCATS ADAPTIVE SIGNAL SYSTEM USING TRAJECTORY DATA

(71) Applicant: BEIJING DIDI INFINITY TECHNOLOGY AND DEVELOPMENT CO., LTD., Beijing (CN)

(72) Inventors: Jianfeng Zheng, Beijing (CN); Xianghong Liu, Beijing (CN); Fuliang Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/221,480

(22) Filed: Dec. 15, 2018

(65) Prior Publication Data

US 2020/0118429 A1 Apr. 16, 2020

Related U.S. Application Data

(63) Continuation of application No. PCT/CN2018/110412, filed on Oct. 16, 2018.

(51) Int. Cl.

| | |
|---|---|
| ***H04W 24/00*** | (2009.01) |
| ***G08G 1/08*** | (2006.01) |
| ***G08G 1/01*** | (2006.01) |
| ***G08G 1/081*** | (2006.01) |

(52) U.S. Cl.

CPC ............... *G08G 1/08* (2013.01); *G08G 1/012* (2013.01); *G08G 1/0145* (2013.01); *G08G 1/081* (2013.01)

(58) Field of Classification Search

USPC ........................................ 340/916, 917, 918

See application file for complete search history.

(56) References Cited

U.S. PATENT DOCUMENTS

| | | | | |
|---|---|---|---|---|
| 6,577,946 B2 * | 6/2003 | Myr | ..................... | G08G 1/0104 455/456.5 |
| 8,064,925 B1 * | 11/2011 | Sun | ........................ | G08G 1/012 455/456.1 |

(Continued)

FOREIGN PATENT DOCUMENTS

| | | |
|---|---|---|
| CN | 102113037 A | 6/2011 |
| CN | 103680143 A | 3/2014 |

(Continued)

OTHER PUBLICATIONS

International Search Report in PCT/CN2018/110412 dated Jul. 18, 2019, 5 pages.

(Continued)

*Primary Examiner* — Brent Swarthout
(74) *Attorney, Agent, or Firm* — Metis IP LLC

(57) ABSTRACT

Embodiments of the disclosure provide systems and methods for optimizing a traffic control plan. The system may include at least one storage device configured to store instructions and at least one processor configured to execute the instructions to perform operations. The operations may include receiving traffic system log data and parsing the traffic system log data to obtain a first set of traffic performance parameters. The operations may also include receiving trajectory data relating to a plurality of vehicle movements and parsing the trajectory data to obtain a second set of traffic performance parameters. The operations may further include determining relationships between vehicle delays and degrees of saturation based on the first and second sets of traffic performance parameters. In addition, the operations may include optimizing the traffic control plan based on the relationships.

18 Claims, 8 Drawing Sheets

(56) References Cited

U.S. PATENT DOCUMENTS

| | | | | |
|---|---|---|---|---|
| 9,293,041 | B2 * | 3/2016 | Cama | G08G 1/07 |
| 9,843,920 | B2 * | 12/2017 | Scarr | G08G 1/012 |
| 2002/0120390 | A1 * | 8/2002 | Bullock | G08G 1/096716 701/117 |
| 2006/0031566 | A1 | 2/2006 | Ohnishi et al. | |
| 2010/0004930 | A1 | 1/2010 | Fargas et al. | |
| 2016/0027299 | A1 | 1/2016 | Raamot | |
| 2017/0178499 | A1 | 6/2017 | Dong et al. | |
| 2018/0211526 | A1 | 7/2018 | Gallagher et al. | |
| 2018/0293884 | A1 | 10/2018 | Liu et al. | |
| 2018/0299290 | A1 | 10/2018 | Slavin et al. | |
| 2019/0043349 | A1 * | 2/2019 | Hofman | G08G 1/08 |

FOREIGN PATENT DOCUMENTS

| | | | |
|---|---|---|---|
| CN | 104637317 | A | 5/2015 |
| CN | 106157615 | A | 11/2016 |
| CN | 106875700 | A | 6/2017 |
| CN | 107123276 | A | 9/2017 |
| TW | I591493 | B | 7/2017 |
| WO | 2013160471 | A2 | 10/2013 |
| WO | 2018132378 | A2 | 7/2018 |
| WO | 2018141403 | A1 | 8/2018 |

OTHER PUBLICATIONS

Written Opinion in PCT/CN2018/110412 dated Jul. 18, 2019, 4 pages.

Examination report No. 1 in Australian Patent Application No. 2018278948 dated Dec. 18, 2019; 6 pages.

Extended European Search Report in European Application No. 18611126.4 dated Jan. 9, 2020, 7 pages.

The Office Action in Canadian Application No. 3027552 dated Mar. 11, 2020, 5 pages.

* cited by examiner

SYSTEM TO OPTIMIZE SCATS ADAPTIVE SIGNAL SYSTEM USING TRAJECTORY DATA

CROSS-REFERENCE TO RELATED APPLICATION

This application is a Continuation of International Application No. PCT/CN2018/110412, filed on Oct. 16, 2018, the contents of which are incorporated herein by reference.

The present disclosure relates to traffic control at intersections, and more particularly, to systems and methods for adaptively optimizing a traffic control plan using vehicle trajectory data.

BACKGROUND

Traditional traffic control systems such as Sydney Coordinated Adaptive Traffic System (SCATS) rely on detectors installed under the pavement to provide traffic feedback for adaptive control of green split. Installation of such detectors are usually expensive. In addition, these detectors are often malfunctioned, resulting in erroneous signals. In some cases, signals from certain detectors are even absent. To enhance the robustness of the detector-based traditional traffic systems, traffic control plans, such as green split plans, are often designed to be very similar to each other, and the conditions for initiating plan change are usually conservatively set, resulting in a nearly-fixed green split regardless of actual traffic conditions, thereby greatly diminishing the benefit of adaptivity.

Embodiments of the disclosure improve the traditional system by utilizing vehicle trajectory data, which are not traditionally used in designing and/or operating traffic control systems. Vehicle trajectory data have become available as a viable information source thanks to the proliferation of app-based ride hailing and ride sharing services, where vehicle trajectory data can be collected based on, for example, vehicle positioning information and map information. Utilizing vehicle trajectory data for optimizing traffic control plans provides an efficient new approach for adaptively responding to traffic conditions.

SUMMARY

Embodiments of the disclosure provide a system for optimizing a traffic control plan. The system may include at least one storage device configured to store instructions. The system may also include at least one processor configured to execute the instructions to perform operations. The operations may include receiving, through a communication interface, traffic system log data. The operations may also include parsing the traffic system log data to obtain a first set of traffic performance parameters. The operation may further include receiving, through the communication interface, trajectory data relating to a plurality of vehicle movements. The operations may further include parsing the trajectory data to obtain a second set of traffic performance parameters. The operations may further include determining relationships between vehicle delays and degrees of saturation based on the first and second sets of traffic performance parameters. In addition, the operations may include optimizing the traffic control plan based on the relationships.

Embodiments of the disclosure also provide a method for optimizing a traffic control plan. The method may include receiving traffic system log data and parsing the traffic system log data to obtain a first set of traffic performance parameters. The method may also include receiving trajectory data relating to a plurality of vehicle movements and parsing the trajectory data to obtain a second set of traffic performance parameters. The method may further include determining relationships between vehicle delays and degrees of saturation based on the first and second sets of traffic performance parameters. In addition, the method may include optimizing the traffic control plan based on the relationships.

Embodiments of the disclosure further provide a non-transitory computer-readable medium having instructions stored thereon that, when executed by at least one processor, causes the at least one processor to perform a method for optimizing a traffic control plan. The method may include receiving traffic system log data and parsing the traffic system log data to obtain a first set of traffic performance parameters. The method may also include receiving trajectory data relating to a plurality of vehicle movements and parsing the trajectory data to obtain a second set of traffic performance parameters. The method may further include determining relationships between vehicle delays and degrees of saturation based on the first and second sets of traffic performance parameters. In addition, the method may include optimizing the traffic control plan based on the relationships.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide systems and methods to adaptively control traffic at intersections by optimizing traffic control plans such as green split plans using trajectory data. Traditional traffic control systems may rely on detectors to provide traffic information to adaptively change green split plans. However, detectors may be malfunctioned, resulting in missing or erroneous detector data. Trajectory data may provide information that is otherwise unavailable due to missing or erroneous detector data. In addition, trajectory data may also provide traffic information in minor or secondary roads that are typically out of reach by traditionally detector networks.

In some embodiments, data parsers may be used to parse traffic control system log data and vehicle trajectory data to obtain traffic performance parameters. The traffic performance parameters may be used to determine relationships between vehicle delays and degrees of saturation. The relationships may then be used to optimize an initial traffic control plan to determine a green split plan to balance degrees of saturation in multiple strategy approaches and/or minimize a total vehicle delay at an intersection.

Figure 1:
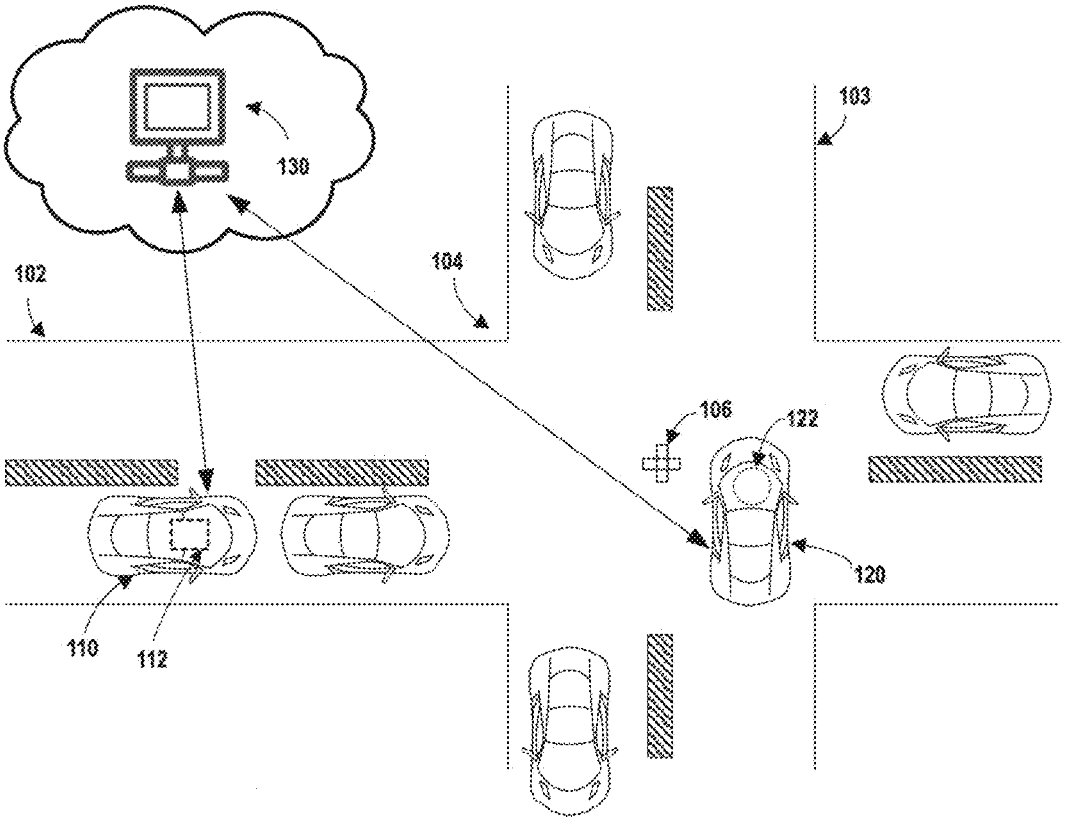
FIG. 1 illustrates an exemplary scene of intersection traffic, according to embodiments of the disclosure.

FIG. 1 illustrate an exemplary scene depicting traffic conditions at an intersection. As shown in FIG. 1, multiple vehicles may travel along intersecting roads 102 and 103 and may be controlled by a signal light 106 at an intersection 104. Signal light 106 may use colored lights to control traffic flows. For example, a green light may indicate that vehicles can move along a direction, while a red light may indicate that vehicles have to stop. The color of signal light 106 may change in cycles, each of which may include a number of stages. In one stage, there may be one or more non-conflicting phases, referring to an indication shown to a particular traffic or pedestrian link. Each phase at an intersection may exist as an electrical circuit from the controller and feeds one or more signal heads. A green split plan, or a green split for short, may refer to a division of available green time between stages within a single cycle. Controlling a green split may regulate traffic flows. For example, a direction having heavier traffic, also referred to as having a high degree of saturation, should be assigned a longer green time to alleviate congestion. In another example, a green split that balance the degrees of saturation among all strategy approaches (e.g., directions allowed at an intersection) may be efficient. In a further example, a green split that minimize the total vehicle delay at an intersection may be beneficial. Embodiments of the present disclosure may adaptively control the green split to achieve one or more of the above objectives.

Some vehicles, such as vehicle 110, may be equipped with a trajectory sensing system 112, which may obtain trajectory data including the location and time information relating to the movement of vehicle 110. The trajectory data may be sent to a server 130. In another example, a driver of a vehicle, such as vehicle 120, may use a terminal device 122 (e.g., a mobile phone) to run a mobile program capable of collecting trajectory data. For instance, the driver may use terminal device 122 to run a ride hailing or ride sharing mobile application, which may include software modules capable of obtaining location, time, speed, and/or pose information of vehicle 120. Terminal device 122 may communicate with server 130 to send the trajectory data to server 130. It is noted that, although intersection 104 shown in FIG. 1 is an intersection between two roads with a traffic light placed in the center, such simplification is exemplary and for illustration purposes only. Embodiments disclosed herein are applicable to any forms of intersections with any suitable configuration of traffic lights.

Figure 2:
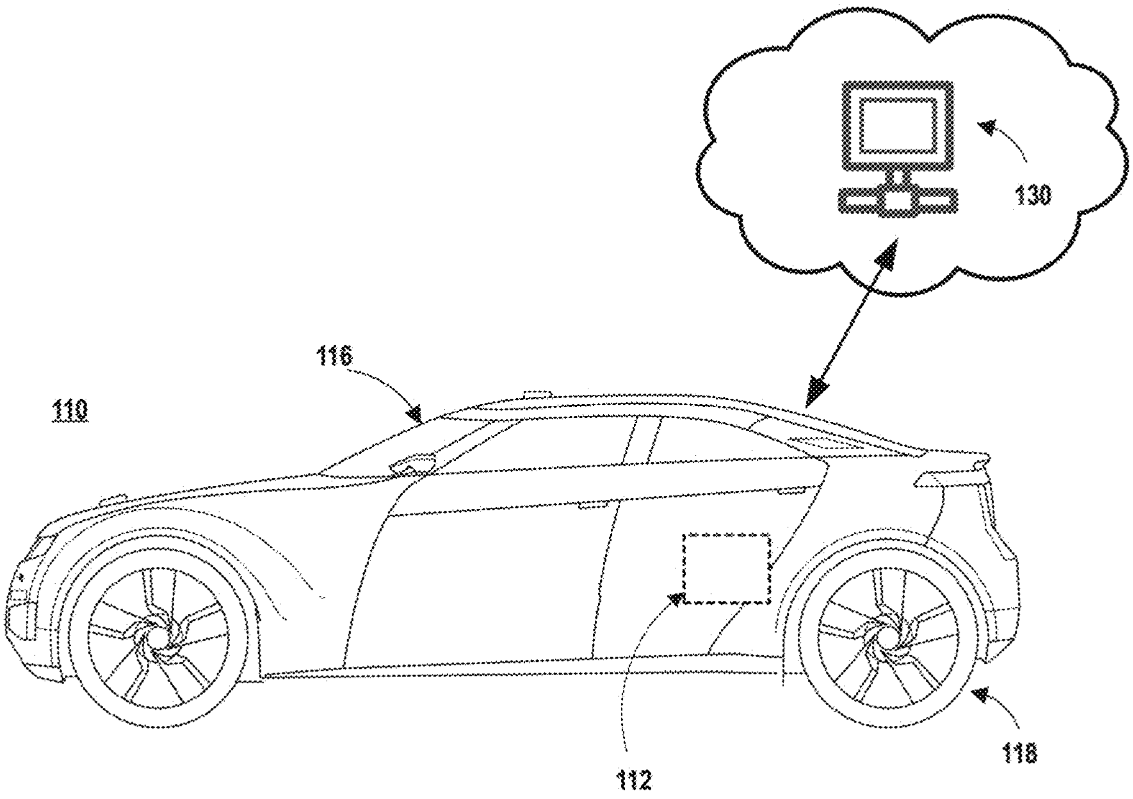
FIG. 2 illustrates a schematic diagram of an exemplary vehicle equipped with a trajectory sensing system, according to embodiments of the disclosure.

FIG. 2 illustrates a schematic diagram of an exemplary vehicle 110 having trajectory sensing system 112, according to embodiments of the disclosure. It is contemplated that vehicle 110 may be an electric vehicle, a fuel cell vehicle, a hybrid vehicle, or a conventional internal combustion engine vehicle. Vehicle 110 may have a body 116 and at least one wheel 118. Body 116 may be any body style, such as a sports vehicle, a coupe, a sedan, a pick-up truck, a station wagon, a sports utility vehicle (SUV), a minivan, or a conversion van. In some embodiments, vehicle 110 may include a pair of front wheels and a pair of rear wheels, as illustrated in FIG. 2. However, it is contemplated that vehicle 110 may have more or less wheels or equivalent structures that enable vehicle 110 to move around. Vehicle 110 may be configured to be all wheel drive (AWD), front wheel drive (FWR), or rear wheel drive (RWD). In some embodiments, vehicle 110 may be configured to be operated by an operator occupying the vehicle, remotely controlled, and/or autonomously controlled.

As illustrated in FIG. 2, vehicle 110 may be equipped with trajectory sensing system 112. In some embodiments, trajectory sensing system 112 may be mounted or attached to the outside of body 116. In some embodiments, trajectory sensing system 112 may be equipped inside body 116, as shown in FIG. 2. In some embodiments, trajectory sensing system 112 may include part of its component(s) equipped outside body 116 and part of its component(s) equipped inside body 116. It is contemplated that the manners in which trajectory sensing system 112 can be equipped on vehicle 110 are not limited by the example shown in FIG. 2, and may be modified depending on the types of sensor(s) included in trajectory sensing system 112 and/or vehicle 110 to achieve desirable sensing performance.

In some embodiments, trajectory sensing system 112 may be configured to capture live data as vehicle 110 travels along a path. For example, trajectory sensing system 112 may include a navigation unit, such as a GPS receiver and/or one or more IMU sensors. A GPS is a global navigation satellite system that provides location and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers.

Vehicle 110 may communicate with server 130 to transmit the sensed trajectory data to server 130. Server 130 may be a local physical server, a cloud server (as illustrated in FIGS. 1 and 2), a virtual server, a distributed server, or any other suitable computing device. Consistent with the present disclosure, server 130 may store a database of trajectory data received from multiple vehicles, which can be used to estimate saturation flows at intersections.

Server 130 may communicate with vehicle 110, and/or components of vehicle 110 (e.g., trajectory sensing system 112) via a wired or wireless network, such as a Local Area Network (LAN), a Wireless Local Area Network (WLAN), a Wide Area Network (WAN), wireless networks such as radio waves, a cellular network, a satellite communication network, and/or a local or short-range wireless network (e.g., Bluetooth™).

Figure 3:
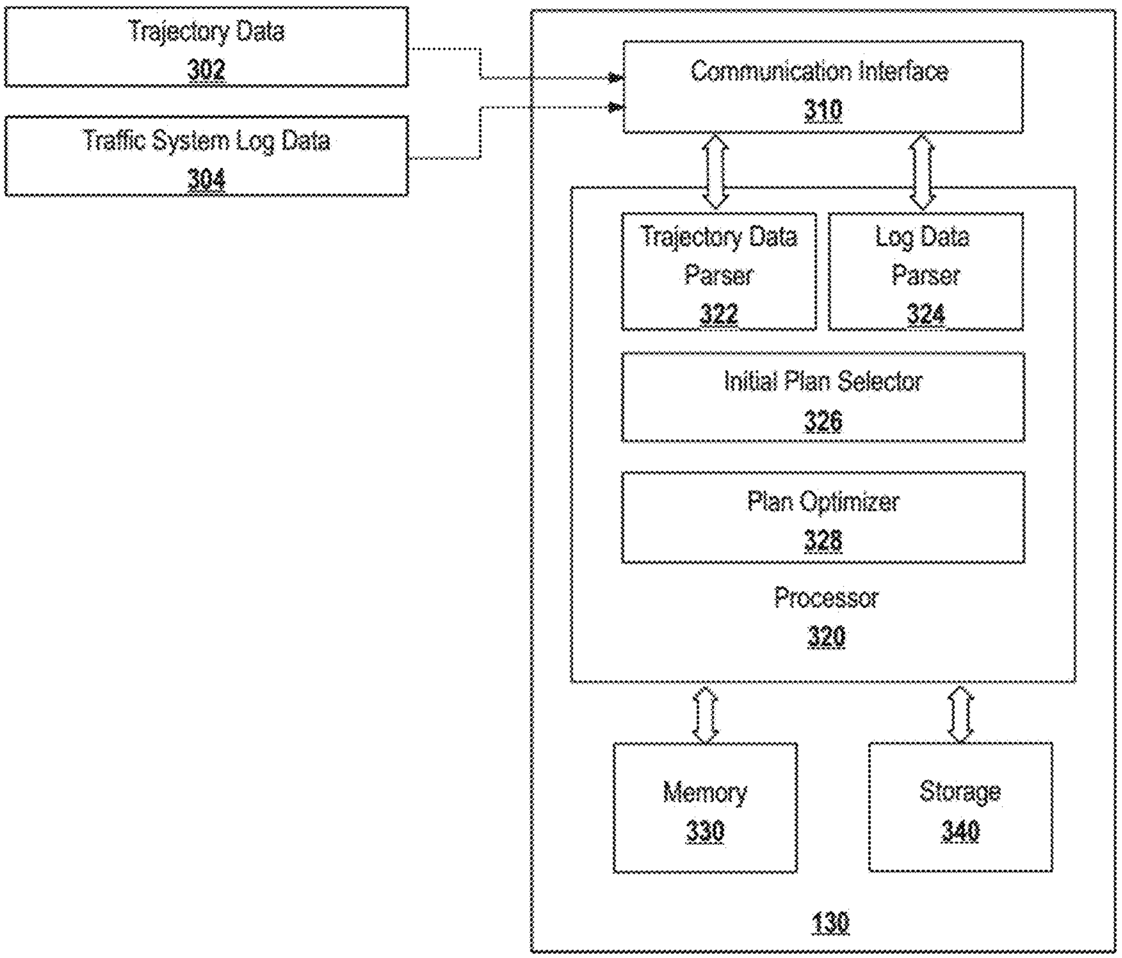
FIG. 3 illustrates a block diagram of an exemplary system for optimizing a traffic control plan, according to embodiments of the disclosure.

FIG. 3 shows an exemplary server 130, according to embodiments of the disclosure. Sever 130 may include a communication interface 310, a processor 320, a memory 330, and a storage 340. In some embodiments, processor 320 may execute software program instructions stored in memory 330 to perform operations to implement software modules such as a trajectory data parser 322, a log data parser 324, an initial plan selector 326, and a plan optimizer 328. In some embodiments, some or all of the above-mentioned software modules may be implemented using hardware, middleware, firmware, or a combination thereof.

Consistent with the present disclosure, server 130 may receive, through communication interface 310, trajectory data 302 from one or more vehicles (e.g., collected by trajectory sensing system 112 and/or terminal device 122).

Trajectory data 302 may include vehicle location and time information that describes a movement trajectory of a vehicle. Server 130 may also receive, through communication interface 310, traffic system log data 304 from a traffic control system, such as a SCATS.

Traffic system log data 304 may include two types of data. The first type may include hourly-aggregated volume data of each strategy approach. The second type may include system controller operation log data, including cycle length, signal phase, offset, green split, as well as a degree of saturation of each strategy approach.

Figure 5:
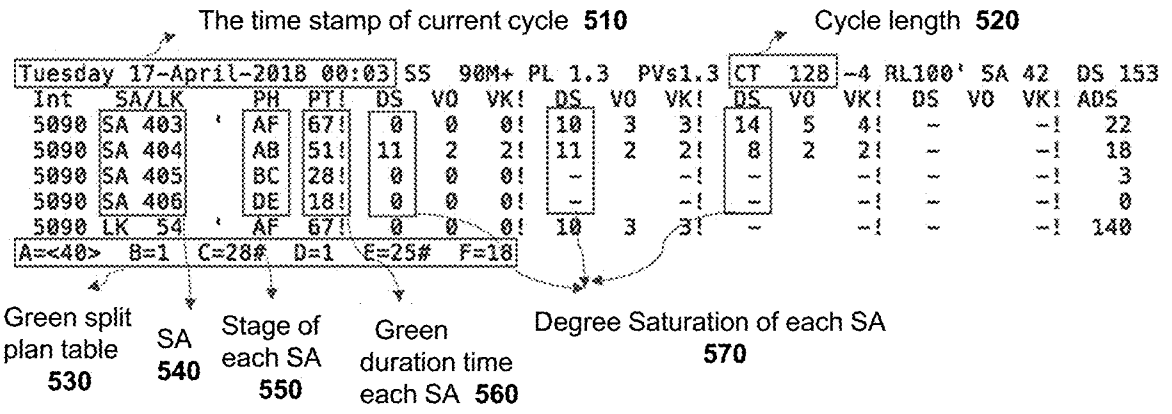
FIG. 5 illustrates exemplary log data, according to embodiments of the disclosure.

FIG. 5 shows exemplary traffic system log data ("log data" for short) 500. As shown in FIG. 5, log data 500 may include a time stamp of current cycle 510, a cycle length 520, strategy approaches 540, a stage of each strategy approach 550, a green duration time of each strategy approach 560, a degree of saturation of each strategy approach 570, and a green split plan table 530.

Figure 6:
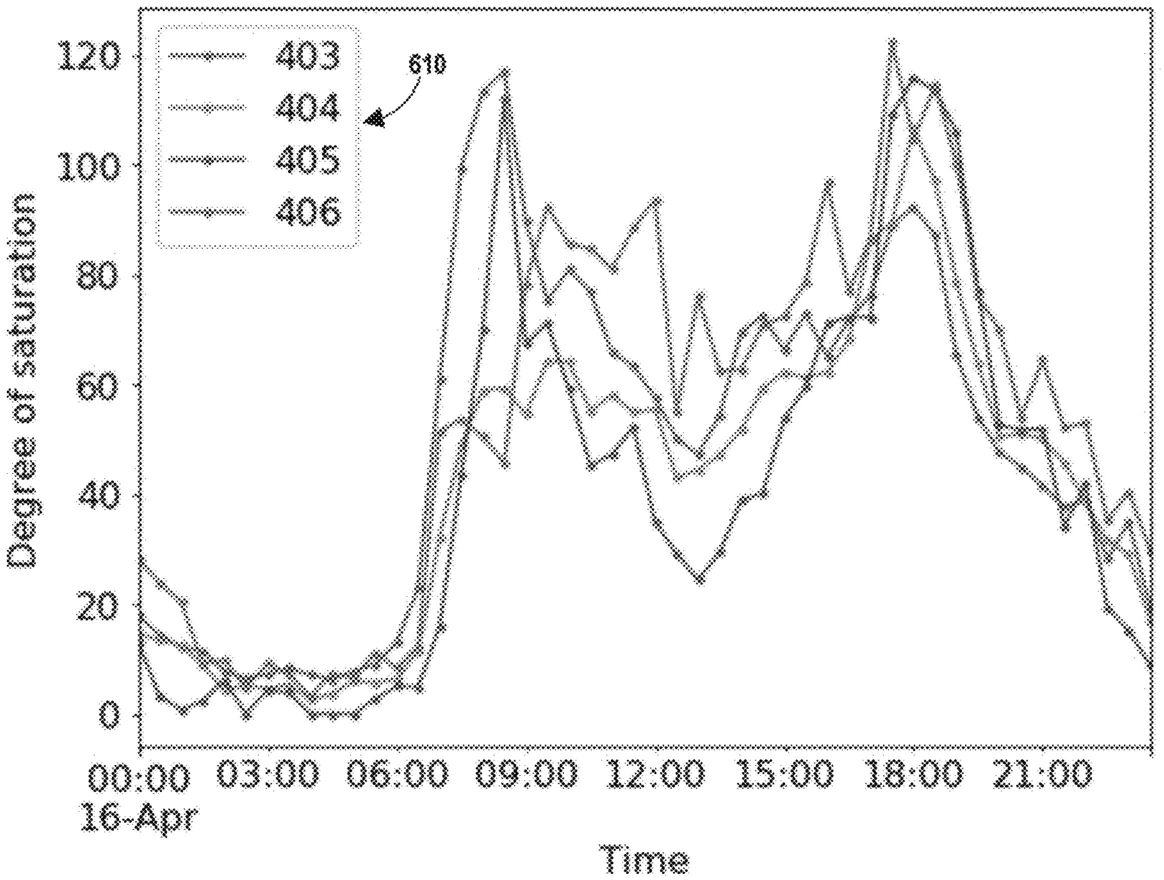
FIG. 6 shows exemplary degree of saturation curves, according to embodiments of the disclosure.

The degrees of saturation 570 of log data 500 may represent traffic conditions of each strategy approach of the intersection. Log data parser 324 may be configured to parse log data 304 to obtain a first set of traffic performance parameters in any particular time period. For example, log data parser 324 may determine a degree of saturation in a strategy approach as a function of time according to a predetermined time interval. FIG. 6 shows several degree of saturation curves in half-hour steps for four strategy approaches indicated by 610. In addition, log data parser 324 may be customized to obtain other traffic performance parameters. For example, log data parser 324 may parse log data 304 to obtain green split data, cycle data, volume data, volume (q)/saturation flow rate (s), etc.

Using traffic system log data alone to determine traffic control plans may have some limitations. First, as described above, traditional traffic control systems such as SCATS use a detector system to capture traffic conditions. The detector system may be malfunctioned or even absent from some intersections, resulting in incomplete logging of traffic conditions. In addition, the degree of saturation data provided by the detector system may only reflect the degree of saturation when a traffic flow is under saturated, and may not reflect the saturation condition when the traffic flow is over saturated. Embodiments of the present disclosure may use trajectory data to supplement the log data, thereby improving the coverage and accuracy of traffic condition estimation at intersections. For example, trajectory data parser 322 may parse trajectory data 302 and output a wide range of traffic performance parameters (referred to as a second set of traffic performance parameters), such as a vehicle delay, the number of probe vehicles, a degree of saturation, etc. for each vehicle movement. Trajectory data parser 322 may project the second set of traffic performance parameters to a strategy approach based on the vehicle movement information and determine a vehicle delay as a function of time according to a predetermined time interval in the strategy approach. The projected second set of traffic performance parameters may be combined with the corresponding first set of performance parameters to optimize traffic control plans.

Figure 7:
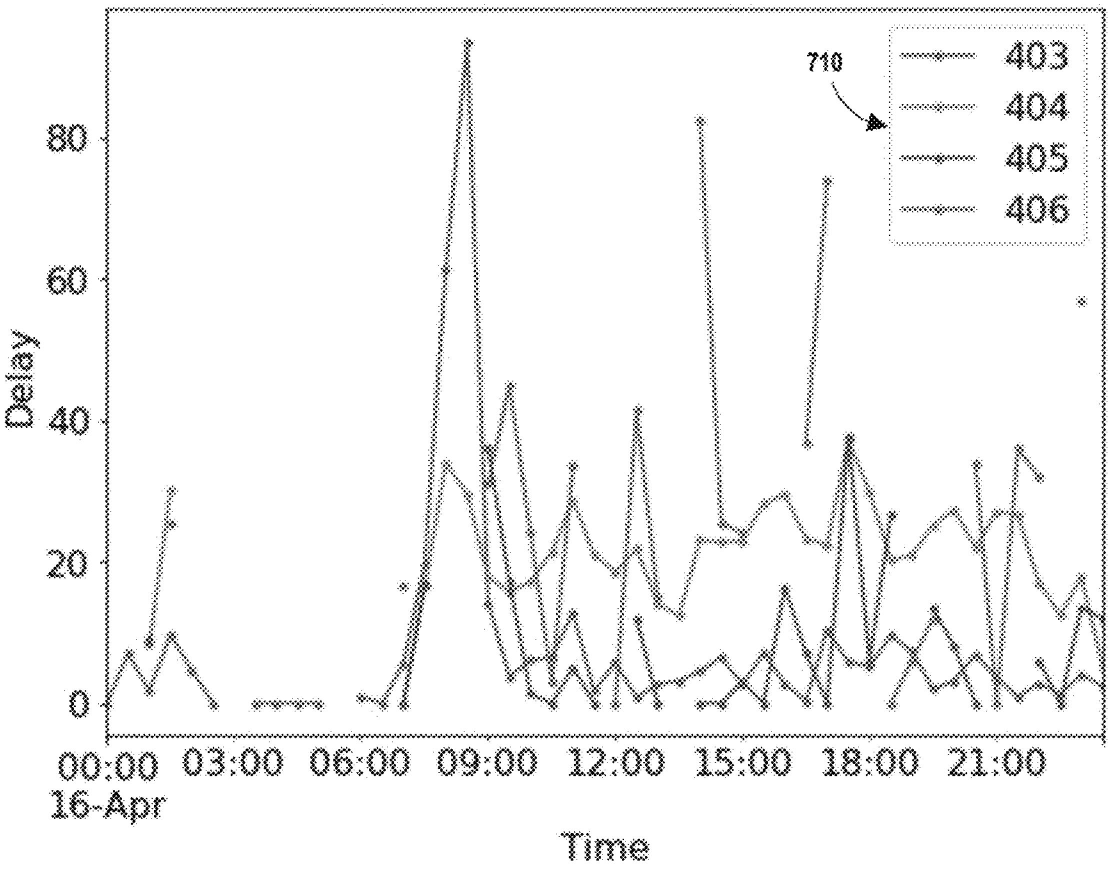
FIG. 7 shows exemplary vehicle delay curves, according to embodiments of the disclosure.
Figure 8:
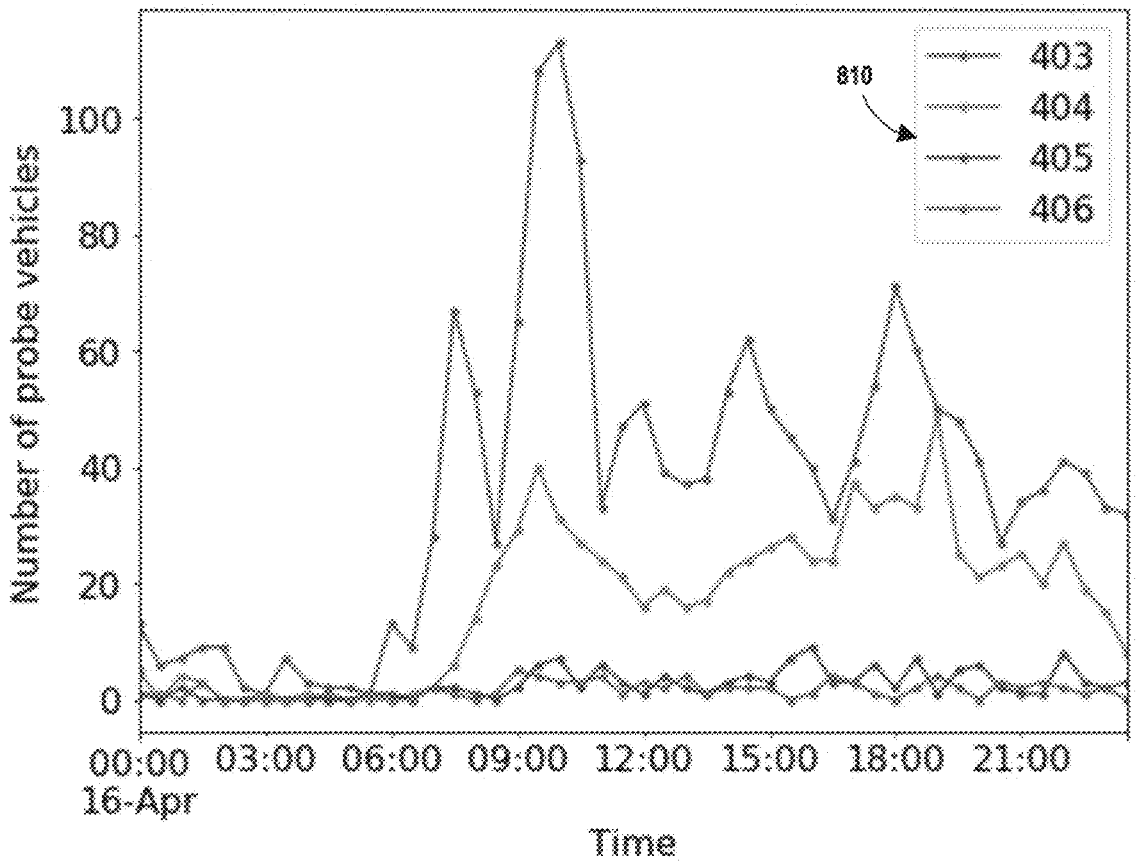
FIG. 8 shows exemplary probe vehicle number curves, according to embodiments of the disclosure.

In some cases, raw data contained in trajectory data 302, such as vehicle delay data, may be incomplete or have low precision. FIG. 7 shows exemplary curves of vehicle delay data in four strategy approaches indicated by 710. As shown in FIG. 7, some part of the vehicle delay curves may be missing. This may be caused by various reasons. For example, in certain minor or secondary roads the number of probe vehicle may be relatively low, resulting in low precision or even missing data. In this case, trajectory data parser 322 may filter and/or smooth the raw data. For example, trajectory data parser 322 may determine a number of probe vehicles as a function of time according to a predetermined time interval, and filter the raw data to remove data entries obtained with too few probe vehicles (e.g., less than 6 entries/hour). FIG. 8 shows several curves indicating the number of probe vehicles as a function of time in four strategy approaches (denoted by 810). Based on information shown in FIG. 8, vehicle delay data may be filtered to remove those entries corresponding to time spans that have too few probe vehicles.

In some embodiments, trajectory data parser 322 may fill certain missing data entries that are within a relatively small time span. Take vehicle delay data for example, trajectory data parser 322 may fill a missing vehicle delay value that is within a predetermined threshold (e.g., one-hour time span) using the non-missing data entry that is immediately preceding or following the missing data entry. For missing data entries that are in relatively large time spans, trajectory data parser 322 may set the data entries to a predetermined value, such as zero. Trajectory data parser 322 may also smooth the data entries, for example using an exponential weighted moving average. In some embodiments, the smoothing parameter may be set to be $\alpha=2/3$.

Returning to FIG. 3, after log data parser 324 parses traffic system log data 304, initial plan selector 326 may determine an initial traffic control plan based on the first set of traffic performance parameters. For example, initial plan selector 326 may select a traffic control plan that minimizes a key degree of saturation, which refers to the maximum degree of saturation among all strategy approaches at an intersection. In some embodiments, initial plan selector 326 may determine the initial traffic control plan based solely on the first set of traffic performance parameters.

In some embodiments, initial plan selector 326 may use the following plan selection method. Assume that the traffic signal cycle is T, and the period used for optimization is t (e.g., a half-hour span or an hour span). Within t, cycle $\tau$ is within a time set $\mathbb{T}^t$. Further, to avoid assigning too many green time to a minor direction during over saturation, the time of the day may be divided into several periods, such as four periods: 6:00 AM-11:00 AM, 11:00 AM-4:00 PM, 4:00 PM-9:00 PM, and night time 9:00 PM-6:00 AM. Assume that the index of these periods are denoted by o, $o\in\mathbb{O}$. Within o, time period t is within a time set $\mathbb{T}^o$.

Initial plan selector 326 may, in time period o, select the following candidate traffic control plan:

$$k_\tau = \arg\min_{k\in\mathbb{K}^o}\max_{a\in\mathbb{A}} DS^a_{k,\tau} = \arg\min_{k\in\mathbb{K}^o}\max_{a\in\mathbb{A}} \theta^a_\tau \cdot \frac{1}{\sum_{p\in\mathbb{P}_a}\Lambda^p_k}$$

where k is the index number of candidate plan, $\mathbb{K}^o$ is the collection of plans in time span o, $k_\tau$ is the index of the selected plan in cycle $\tau$; a is the index of strategy approach, $a\in\mathbb{A}$; $DS_{k,\tau}^a$ is the predicted degree of saturation for plan k, cycle $\tau$, and the ath strategy approach. $\theta_\tau^a$ is a ratio of volume and saturation flow rate, also equals to the product of the degree of saturation and green split $\theta_\tau^a = ds_\tau^a \cdot \sum_{p\in\mathbb{P}_a}\lambda_\tau^p$. p corresponds to the index number of stage, $\mathbb{P}_a$ is the set of stages corresponding to the ath strategy approach. $ds_\tau^a$ and $\lambda_\tau^p$ are degree of saturation and green split during operation of the traffic control system, respectively, according to the traffic system log. $\Lambda_k^p$ is the green split plan to be optimized.

During operation, a traffic control system may vote for the candidate green split plan in each cycle $\tau$ according to the degree of saturation feedback. A plan that wins two out of three consecutive cycles may be selected as the new plan. To approximate, initial plan selector 326 assumes that within a time span $t\in\mathbb{T}^o$, the traffic control system operates a plan having the minimal sum of the key degrees of saturation:

$$k_t = \arg\min_{k\in\mathbb{K}^o}\sum_{\tau\in\mathbb{T}^t}\max_{a\in\mathbb{A}} DS^a_{k,\tau} = \arg\min_{k\in\mathbb{K}^o}\max_{a\in\mathbb{A}}\theta^a_t\cdot\frac{1}{\sum_{p\in\mathbb{P}_a}\Lambda^p_k}$$

where $\theta_t^a$ is the average value of $\theta_\tau^a$ within t time span, and $$\theta^a_\tau = \frac{\sum_{\tau\in\mathbb{T}^t}\theta^a_\tau}{|\mathbb{T}^t|}.$$

Plan optimizer 328 may optimizing the initial traffic control plan based on the second set of traffic performance parameters. In some embodiments, several optimization objective may be considered. For example, i) balancing the degrees of saturation captured by the detectors of a traffic control system, provided by traffic system log data 304; ii) balancing the degrees of saturation provided by trajectory data 302; and iii) minimizing a total vehicle delay at an intersection.

The first optimization objective may be used when the detectors of the traffic control system have good coverage, are well functioning, and the signal errors are relatively small. For example, for each time period o, to minimize the sum of key degrees of saturation for all $t\in\mathbb{T}^o$, the objective function can be written as:

$$\min\sum_{t\in\mathbb{T}^o}\max_{a\in\mathbb{A}}\theta^a_t\cdot\frac{1}{\sum_{p\in\mathbb{P}_a}\Lambda^p_{k_t}}$$

In most cases, however, the coverage of the detectors may be poor, or the signals may have relatively large errors. In such cases, optimization can be performed using the degrees of saturation data provided by trajectory data 302 to balance degrees of saturation in multiple strategy approaches. For example, a green split plan may be determined using the following objective function:

$$\min\sum_{t\in\mathbb{T}^o}\max_{m\in\mathbb{M}} s^m_t\cdot\frac{\sum_{p\in\mathbb{P}^m}\lambda^p_t}{\sum_{p\in\mathbb{P}^m}\Lambda^p_{k_t}}$$

where $s_\tau^m$ is the degree of saturation of mth movement during time span t, $\mathbb{P}^m$ is the set of stages corresponding to the mth movement.

To minimize the total vehicle delay, plan optimizer 328 may determining a relationship between a vehicle delay and a degree of saturation. While the relationship also relates to vehicle arrival distribution, saturation flow rate, green split, etc., when the range of green split changes is relatively small, for each individual movement, it can be assumed that the above-mentioned factors stay relatively constant within a time period. Therefore, plan optimizer 328 may determine a relationship between a vehicle delay and a degree of saturation for each individual vehicle movement, and, based on the degree of saturation, derive the relationship between vehicle delay and green split:

$$D^m_t = f^m\left(s^m_t\cdot\frac{\sum_{p\in\mathbb{P}^m}\lambda^p_t}{\sum_{p\in\mathbb{P}^m}\Lambda^p_{k_t}}\right)$$

where $D_\tau^m$ is the projected vehicle delay, $f^m(\bullet)$ is the mapping function between the degree of saturation and the vehicle delay for the mth movement.

In some embodiment, the following method may be used to model $f^m(\bullet)$:

$$d_t^m = f^m(s_t^m) = A^{e^{B\cdot s_t^m}} - A$$

In some embodiments, a compensation coefficient $\alpha$, $\alpha>1$ may be used for the vehicle delay to avoid a situation where the minor direction is always assigned the minimal green time, causing heavy delay. Then, the total vehicle delay optimization objective can be written as:

$$\min TD^o\sum_{t\in\mathbb{T}^o}\sum_{m\in\mathbb{M}}(D^m_t)^\alpha q^m_t = \sum_{t\in\mathbb{T}^o}\sum_{m\in\mathbb{M}} f^m\left(s^m_t\cdot\frac{\sum_{p\in\mathbb{P}^m}\lambda^p_t}{\sum_{p\in\mathbb{P}^m}\Lambda^p_{k_t}}\right)^\alpha q^m_t$$

where $TD^o$ is the total vehicle delay in time span o, and $q_t^m$ is the volume.

Constraints for optimizing $\Lambda_k^p$ may include regular constraints as well as transition constraints. Regular constraints can be written as:

$$\sum_{p\in\mathbb{P}}\Lambda^p_k = 1,\ k\in\mathbb{K}^o$$

$$L^p \le \Lambda^p_k U^p,\ k\in\mathbb{K}^o$$

where $L^p$ and $U^p$ are the minimal and maximal green time in stage p, respectively.

In some embodiments, transition constraints may be described as i) adjacent green split plans can only change in two stages; and ii) in a single stage, the range of green split change is within 4%-7%.

In some embodiments, server 130 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 130 may be located in a cloud, or may be alternatively in a single location (such as inside vehicle 110 or a mobile device) or distributed locations. Components of server 130 may be in an integrated device, or distributed at different locations but communicate with each other through a network (not shown).

Communication interface 310 may send data to and receive data from a vehicle or its components such as trajectory sensing system 112 and/or terminal device 122 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 310 can be an integrated services digital network (ISDN) card, cable modem, satellite modem, or a modem to provide a data communication connection. As another example, communication interface 310 can be a local area network (LAN) card to provide a data communication connection to a compatible LAN. Wireless links can also be implemented by communication interface 310. In such an implementation, communication interface 310 can send and receive electrical, electromagnetic or optical signals that carry digital data streams representing various types of information via a network.

Consistent with some embodiments, communication interface 310 may receive trajectory data 302 and traffic system log data 304. Communication interface 310 may further provide the received trajectory data 302 and traffic system log data 304 to trajectory data parser 322 and log data parser 324 for processing, respectively.

Processor 320 may include any appropriate type of general-purpose or special-purpose microprocessor, digital signal processor, or microcontroller. Processor 320 may be configured as a stand-alone processor module dedicated to analyzing traffic data. Alternatively, processor 320 may be configured as a shared processor module for performing other functions unrelated to traffic data analysis.

As shown in FIG. 3, processor 320 may include multiple modules, such as trajectory data parser 322, log data parser 324, initial plan selector 326, plan optimizer 328, and the like. These modules (and any corresponding sub-modules or sub-units) can be hardware units (e.g., portions of an integrated circuit) of processor 320 designed for use with other components or software units implemented by processor 320 through executing at least part of a program. The program may be stored on a computer-readable medium, and when executed by processor 320, it may perform one or more functions or operations. Although FIG. 3 shows units 322-328 all within one processor 320, it is contemplated that these units may be distributed among multiple processors located near or remotely with each other.

Memory 330 and storage 340 may include any appropriate type of mass storage provided to store any type of information that processor 320 may need to operate. Memory 330 and/or storage 340 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 330 and/or storage 340 may be configured to store one or more computer programs that may be executed by processor 320 to perform functions disclosed herein. For example, memory 330 and/or storage 340 may be configured to store program(s) that may be executed by processor 320 to analyze traffic data.

Memory 330 and/or storage 340 may be further configured to store information and data used by processor 320. For instance, memory 330 and/or storage 340 may be configured to store trajectory data 302 and traffic system log data 304. The various types of data may be stored permanently, removed periodically, or disregarded immediately after each frame of data is processed.

Figure 4:
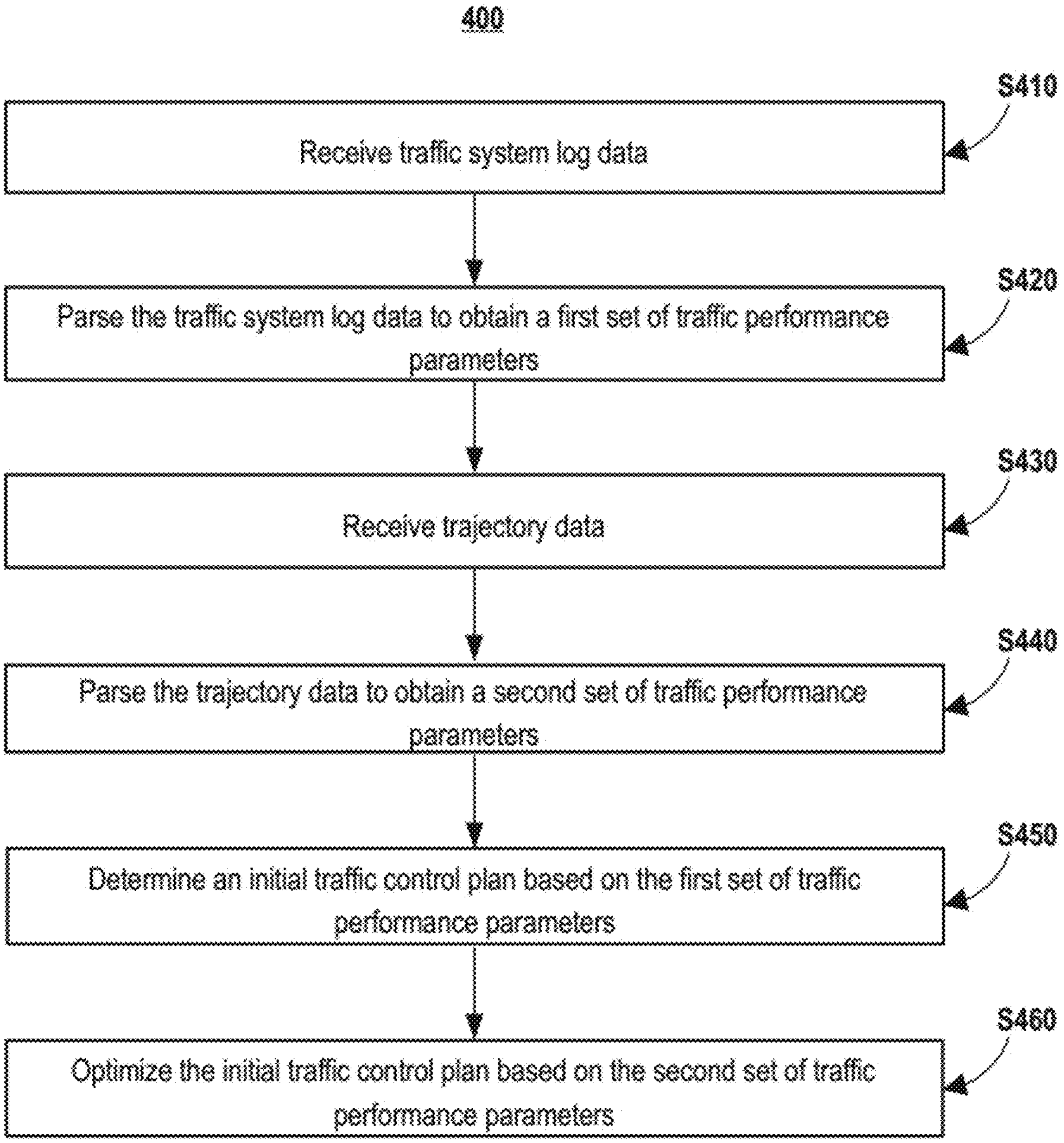
FIG. 4. illustrates a flowchart of an exemplary method for optimizing a traffic control plan, according to embodiments of the disclosure.

FIG. 4 illustrates a flowchart of an exemplary method 400 for optimizing a traffic control plan, according to embodiments of the disclosure. In some embodiments, method 400 may be implemented by server 130. However, method 400 is not limited to that exemplary embodiment. Method 400 may include steps S410-S460 as described below. It is to be appreciated that some of the steps may be optional to perform the disclosure provided herein. Further, some of the steps may be performed simultaneously, or in a different order than shown in FIG. 4.

In step S410, processor 320 may receive traffic system log data 304 through communication interface 310. Traffic system log data 304 may be provided by a traffic control system, such as a SCATS. In step S420, log data parser 324 may parse the traffic system log data to obtain a first set of traffic performance parameters, such as degrees of saturation, cycle length, green split plans, etc.

In step S430, processor 320 may receive trajectory data 302 from one or more vehicles (e.g., vehicles 110 and 120) through communication interface 310. For example, trajectory sensing system 112 may capture trajectory data 302 including location and time information and provide trajectory data 302 to processor 320 via communication interface 310. In another example, terminal device 122 may collect trajectory data 302 and upload trajectory data 302 to server 130 through communication interface 310. As a result, processor 320 may receive trajectory data 302. Trajectory data 302 may be stored in memory 330 and/or storage 340 as input data for performing traffic control optimization. In some embodiments, trajectory data 302 may be related to a plurality of vehicle movements (e.g., vehicles 110 and 120) with respect to an intersection (e.g., intersection 104).

In step S440, trajectory data parser 322 may parse the trajectory data 302 to obtain a second set of traffic performance parameters, including degrees of saturation in multiple movements, vehicle delays, etc. Trajectory data parser 322 may project the parsed second set of traffic performance parameters to each strategy approach to supplement the first set of traffic performance parameters.

In step S450, initial plan selector 326 may determine an initial traffic control plan based on the first set of parameters, as described above. The initial plan may be optimized in step S460 by plan optimizer 328 to determine an optimized green split plan to minimize the total vehicle delays and/or balance degrees of saturation in multiple strategy approaches.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A system for optimizing a traffic control plan, comprising:

at least one storage device configured to store instructions; and logic circuits in communication with the at least one storage device, the logic circuits being configured to execute the instructions to perform operations, the operations comprising:

receiving, through a communication interface, signals including traffic system log data;

parsing the traffic system log data to obtain a first set of traffic performance parameters;

receiving, through the communication interface, signals including trajectory data relating to a plurality of vehicle movements;

parsing the trajectory data to obtain a second set of traffic performance parameters, wherein parsing the trajectory data comprises projecting the second set of traffic performance parameters to a strategy approach, determining, in the strategy approach, a vehicle delay as a function of time according to a predetermined time interval, and adjusting the vehicle delay based on data quality;

determining relationships between vehicle delays and degrees of saturation based on the first and second sets of traffic performance parameters; and optimizing the traffic control plan based on the relationships.

2. The system of claim 1, wherein parsing the traffic system log data comprises:

determining a degree of saturation in a strategy approach as a function of time according to a predetermined time interval.

3. The system of claim 1, wherein the adjusting the vehicle delay based on data quality comprises:

determining a number of probe vehicles as a function of time according to the predetermined time interval; and filtering the vehicle delay based on the number of probe vehicles.

4. The system of claim 1, wherein the adjusting the vehicle delay based on data quality comprises:

determining one or more missing vehicle delay values corresponding to one or more time spans;

filling a missing vehicle delay value with an adjacent vehicle delay value when the corresponding time span is equal to or less than a predetermined threshold;

resetting a missing vehicle delay value to a predetermined value when the corresponding time span is greater than the predetermined threshold; and smoothing the vehicle delay using a moving average method.

5. The system of claim 1, wherein the operations comprise:

determining an initial traffic control plan based on the first set of traffic performance parameters.

6. The system of claim 5, wherein the operations comprise:

optimizing the initial traffic control plan based on the second set of traffic performance parameters.

7. The system of claim 6, wherein the operations comprise:

determining a green split plan to balance degrees of saturation in multiple strategy approaches based on saturation data in the second set of traffic performance parameters.

8. The system of claim 6, wherein the operations comprise:

determining, for each of the plurality of vehicle movements, a relationship between a vehicle delay and a degree of saturation; and determining, based on the relationships between vehicle delays and degrees of saturations for the plurality of vehicle movements, a green-split plan to minimize a total vehicle delay at an intersection.

9. The system of claim 6, wherein the operations comprise:

determining relationships between vehicle delays and green split plans based on the relationships between vehicle delays and degrees of saturation; and determining, based on the relationships between vehicle delays and green split plans, a green-split plan to minimize a total vehicle delay at an intersection.

10. A method for optimizing a traffic control plan implemented on a computing device having processing circuits, at least one non-transitory computer-readable storage medium, and a communication platform connected to a network, comprising:

receiving, by the processing circuits, signals including traffic system log data;

parsing, by the processing circuits, the traffic system log data to obtain a first set of traffic performance parameters;

receiving, by the processing circuits, signals including trajectory data relating to a plurality of vehicle movements;

parsing, by the processing circuits, the trajectory data to obtain a second set of traffic performance parameters, wherein parsing the trajectory data comprises projecting the second set of traffic performance parameters to a strategy approach, determining, in the strategy approach, a vehicle delay as a function of time according to a predetermined time interval, and adjusting the vehicle delay based on data quality;

determining, by the processing circuits, relationships between vehicle delays and degrees of saturation based on the first and second sets of traffic performance parameters; and optimizing, by the processing circuits, the traffic control plan based on the relationships.

11. The method of claim 10, wherein parsing the traffic system log data comprises:

determining a degree of saturation in a strategy approach as a function of time according to a predetermined time interval.

12. The method of claim 10, wherein adjusting the vehicle delay based on data quality comprises:

determining a number of probe vehicles as a function of time according to the predetermined time interval; and filtering the vehicle delay based on the number of probe vehicles.

13. The method of claim 10, wherein adjusting the vehicle delay based on data quality comprises:

determining one or more missing vehicle delay values corresponding to one or more time spans;

filling a missing vehicle delay value with an adjacent vehicle delay value when the corresponding time span is equal to or less than a predetermined threshold;

resetting a missing vehicle delay value to a predetermined value when the corresponding time span is greater than the predetermined threshold; and smoothing the vehicle delay using a moving average method.

14. The method of claim 10, comprising:

determining an initial traffic control plan based on the first set of traffic performance parameters; and optimizing the initial traffic control plan based on the second set of traffic performance parameters.

15. The method of claim 14, comprising:

determining a green split plan to balance degrees of saturation in multiple strategy approaches based on saturation data in the second set of traffic performance parameters.

16. The method of claim 14, comprising:

determining, for each of the plurality of vehicle movements, a relationship between a vehicle delay and a degree of saturation; and determining, based on the relationships between vehicle delays and degrees of saturations for the plurality of vehicle movements, a green-split plan to minimize a total vehicle delay at an intersection.

17. The method of claim 14, comprising:

determining relationships between vehicle delays and green split plans based on the relationships between vehicle delays and degrees of saturation; and determining, based on the relationships between vehicle delays and green split plans, a green-split plan to minimize a total vehicle delay at an intersection.

18. A non-transitory computer-readable medium having instructions stored thereon, wherein the instructions, when executed by processing circuits, cause the processing circuits to perform a method for optimizing a traffic control plan, the method comprising:

receiving signals including traffic system log data;

parsing the traffic system log data to obtain a first set of traffic performance parameters;

receiving signals including trajectory data relating to a plurality of vehicle movements;

parsing the trajectory data to obtain a second set of traffic performance parameters, wherein parsing the trajectory data comprises projecting the second set of traffic performance parameters to a strategy approach, determining, in the strategy approach, a vehicle delay as a function of time according to a predetermined time interval, and adjusting the vehicle delay based on data quality;

determining relationships between vehicle delays and degrees of saturation based on the first and second sets of traffic performance parameters; and optimizing the traffic control plan based on the relationships.

* * * * *